United States Patent
Chen et al.

(10) Patent No.: US 10,736,073 B2
(45) Date of Patent: Aug. 4, 2020

(54) SFN INDICATION METHOD, TERMINAL DEVICE, AND POSITIONING SERVER AND SYSTEM

(71) Applicant: HUAWEI TECHNOLOGIES CO., LTD., Shenzhen, Guangdong (CN)

(72) Inventors: Zhe Chen, Shenzhen (CN); Zhe Jin, Beijing (CN); Yiling Wu, Beijing (CN); Weiliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/401,973

(22) Filed: May 2, 2019

(65) Prior Publication Data

US 2019/0261304 A1 Aug. 22, 2019

Related U.S. Application Data

(63) Continuation of application No. PCT/CN2016/104784, filed on Nov. 4, 2016.

(51) Int. Cl.
*H04W 24/00* (2009.01)
*H04W 64/00* (2009.01)
(Continued)

(52) U.S. Cl.
CPC .......... *H04W 64/00* (2013.01); *G01S 5/0236* (2013.01); *G01S 5/10* (2013.01); *G01S 5/00* (2013.01); *H04W 84/042* (2013.01)

(58) Field of Classification Search
CPC ....... H04W 64/00; H04W 84/042; G01S 5/10; G01S 5/0236; G01S 5/00
(Continued)

(56) References Cited

U.S. PATENT DOCUMENTS 8,660,072 B2 * 2/2014 Siomina .................. G01S 1/042
370/329
8,700,069 B2 * 4/2014 MacNaughtan ...... G01S 5/0252
340/815.49
(Continued)

FOREIGN PATENT DOCUMENTS

CN 102349338 A 2/2012
CN 102457960 A 5/2012
(Continued)

OTHER PUBLICATIONS

3GPP TS 36.355 V13.2.0 (Sep. 2016), "3rd Generation Partnership Project; Technical Specification Group Radio Access Network; Evolved Universal Terrestrial Radio Access (E-UTRA); LTE Positioning Protocol (LPP) (Release 13)," Technical Specification, Sep. 2016, 141 pages.
(Continued)

*Primary Examiner* — Amancio Gonzalez
(74) *Attorney, Agent, or Firm* — Fish & Richardson P.C.

(57) ABSTRACT

The present disclosure relates to SFN indication methods, terminal devices, and positioning servers and systems. One example method includes obtaining an SFN offset indication parameter of a cell i, sending the SFN offset indication parameter of the cell i to a terminal device, receiving the SFN offset indication parameter of the cell i from the positioning server, obtaining a frame number of a radio frame n of a cell j, and determining a phase rotation parameter of the cell i based on the frame number of the radio frame n of the cell j and the SFN offset indication parameter of the cell i, or obtaining a sequence initialization factor used by a narrowband positioning reference signal (NPRS) on a radio frame m of the cell i, and obtaining the NPRS on the radio frame m of the cell i based on the sequence initialization factor.

13 Claims, 11 Drawing Sheets

(51) Int. Cl.
*G01S 5/10* (2006.01)
*G01S 5/02* (2010.01)
*H04W 84/04* (2009.01)
*G01S 5/00* (2006.01)

(58) Field of Classification Search
USPC ........................................................ 455/456.1
See application file for complete search history.

(56) References Cited

U.S. PATENT DOCUMENTS

| | | | | |
|---|---|---|---|---|
| 8,989,768 | B2* | 3/2015 | Woo | G01S 5/0236 |
| | | | | 455/456.1 |
| 9,155,063 | B2* | 10/2015 | Woo | G01S 5/0221 |
| 9,432,809 | B2* | 8/2016 | Fischer | H04W 4/023 |
| 9,591,450 | B2* | 3/2017 | Fischer | H04W 4/023 |
| 9,801,022 | B2* | 10/2017 | Fischer | H04W 4/023 |
| 10,317,509 | B2* | 6/2019 | Fischer | G01S 5/0226 |
| 2011/0312339 | A1* | 12/2011 | Kuningas | G01S 5/0226 |
| | | | | 455/456.1 |
| 2012/0015667 | A1 | 1/2012 | Woo et al. | |
| 2012/0190373 | A1* | 7/2012 | Tenny | H04W 56/0015 |
| | | | | 455/447 |
| 2015/0072708 | A1 | 3/2015 | Lim et al. | |
| 2015/0141048 | A1* | 5/2015 | Woo | H04W 64/006 |
| | | | | 455/456.1 |
| 2015/0208198 | A1 | 7/2015 | Duan | |
| 2015/0296359 | A1 | 10/2015 | Edge | |
| 2016/0337798 | A1 | 11/2016 | Fischer | |

FOREIGN PATENT DOCUMENTS

| | | |
|---|---|---|
| CN | 103004267 A | 3/2013 |
| CN | 103444243 A | 12/2013 |
| CN | 105393612 A | 3/2016 |
| JP | 2012519870 A | 8/2012 |
| WO | 2010104451 A1 | 9/2010 |

OTHER PUBLICATIONS

3GPP TS 36.455 V13.1.0 (Mar. 2016), "3rd Generation Partnership Project; Technical Specification Group Radio Access Network; Evolved Universal Terrestrial Radio Access (E-UTRA); LTE Positioning Protocol A (LPPa) (Release 13)," Technical Specification, 61 pages.

3GPP TS 36.211 V14.0.0 (Sep. 2016), 3rd Generation Partnership Project; Technical Specification Group Radio Access Network; Evolved Universal Terrestrial Radio Access (E-UTRA); Physical channels and modulation(Release 14), 170 pages.

Extended European Search Report issued in European Application No. 16920617.4 dated Jun. 7, 2019, 13 pages.

PCT International Search Report and Written Opinion issued in International Application No. PCT/CN2016/104784 dated May 12, 2017, 17 pages (with English translation).

R1-1608881—Nokia et al., "Existing Downlink Signals for OTDOA Positioning in NB-IoT", 3GPP TSG RAN WG1 Meeting #86bis, 3GPP Draft; Lisbon, Portugal, Oct. 10-14, 2016, XP051148935, 4 pages.

R1-104752—LG Electronics, "Clarification of SFN acquisition of reference/neighbor cells on OTDOA", 3GPP TSG RAN WG1 #62, 3GPP Draft; Madrid, Spain; Aug. 23-27, 2010, XP050450131, 4 pages.

Office Action issued in Chinese Application No. 201680090601.3 dated Nov. 26, 2019, 7 pages.

Office Action issued Japanese Application No. 2019-523579 dated Jun. 2, 2020, 6 pages (with English translation).

* cited by examiner

Cell j: SFN=0, frames 1-7 with $\theta_f=(33/132)*0$, $\theta_f=(33/132)*1$, $\theta_f=(33/132)*2$, $\theta_f=(33/132)*3$, $\theta_f=(33/132)*1$, $\theta_f=(33/132)*2$, $\theta_f=(33/132)*3$ Cell i: SFN=7, frames 8-14 with $\theta_f=(33/132)*0$, $\theta_f=(33/132)*3$, $\theta_f=(33/132)*0$, $\theta_f=(33/132)*1$, $\theta_f=(33/132)*2$

SFN INDICATION METHOD, TERMINAL DEVICE, AND POSITIONING SERVER AND SYSTEM

CROSS-REFERENCE TO RELATED APPLICATIONS

This application is a continuation of International Application No. PCT/CN2016/104784, filed on Nov. 4, 2016, the disclosure of which is hereby incorporated by reference in its entirety.

TECHNICAL FIELD

The present application relates to the communications field, and in particular, to an SFN (system frame number) indication method, a terminal device, and a positioning server and system.

BACKGROUND

The 3GPP (English full name: 3rd generation partnership project), a mobile communications standardization organization, proposes an enhanced NB-IoT (English full name: narrowband internet of things) subject. Positioning is one of main research content of the subject.

Currently, there are diverse positioning technologies. An OTDOA (English full name: observed time difference of arrival) positioning technology is one of technologies on which the enhanced NB-IoT subject focuses. FIG. 1 is a schematic diagram of an OTDOA positioning technology. In the OTDOA positioning technology, a plurality of base stations 01 send synchronization signals to a terminal device 02, and the terminal device 02 obtains arrival time information by measuring the synchronization signals sent by the plurality of base stations 01. Then, a geographical location of the terminal device 02 is obtained through calculation with reference to geographical locations of the plurality of base stations 01.

Specifically, an NSSS (narrowband secondary synchronization signal) is sent in NB-IoT in downlink, and the terminal device obtains arrival time information of downlink signals of a plurality of cells by measuring NSSSs of these cells, so as to support OTDOA positioning. Further, the terminal device determines the NSSS by detecting an NSSS sequence, and an expression manner of the NSSS sequence is $$d(n) = b_q(m) e^{-j2\pi\theta_f n} e^{-j\frac{\pi u n'(n'+1)}{131}},$$

where
n=0, 1, . . . , 131;
n'=n mod 131;
m=n mod 128;
u=$N_{ID}^{Ncell}$ mod 126+3;

$$q = \left\lfloor \frac{N_{ID}^{Ncell}}{126} \right\rfloor;$$

and
$b_q(m)$ is a binary sequence, $e^{-j2\pi\theta_f n}$ is a phase rotation sequence, a phase rotation parameter is $\theta_f=33/132(n_f/2)\bmod 4$, and $n_f$ is a radio frame number of a radio frame in which the NSSS is located.

When detecting the NSSS sequence, the terminal device needs to separately detect the binary sequence $b_q(m)$ and the phase rotation sequence $e^{-j2\pi\theta_f n}$. For the phase rotation sequence $e^{-j2\pi\theta_f n}$ in frequency domain, a cyclic value of the phase rotation parameter $\theta_f$ is represented as a cyclic shift when the cyclic value is reflected in time domain. Therefore, when detecting the phase rotation sequence $e^{-j2\pi\theta_f n}$, the terminal device cannot distinguish phase rotation. Consequently, a relatively large error occurs in a timing measurement result, thereby further decreasing positioning precision. In addition, computational complexity is relatively high because phase rotation sequences need to be compared one by one.

SUMMARY

Embodiments of the present application provide an SFN indication method, a terminal device, and a positioning server and system, so as to avoid erroneous determining caused because phase rotation cannot be distinguished when a phase rotation sequence is detected.

To achieve the foregoing objective, the following technical solutions are used in the embodiments of the present application.

According to an aspect, an embodiment of the present application provides a system frame number SFN indication method, including: obtaining, by a positioning server, an SFN offset indication parameter of a cell i, where the SFN offset indication parameter indicates a relative offset between an SFN of a radio frame m of the cell i and an SFN of a radio frame n of a cell j; and sending, by the positioning server, the SFN offset indication parameter of the cell i to a terminal device. According to the SFN indication method provided in this embodiment of the present application, the positioning server obtains the relative offset between the SFN of the cell i and the SFN of the cell j, and then the terminal device determines a phase rotation parameter of the cell i based on the relative offset, so as to obtain a phase rotation sequence based on the phase rotation parameter. Therefore, the terminal device can detect an NSSS sequence of the cell i based on the determined phase rotation parameter, without a need of detecting the phase rotation sequence, thereby avoiding erroneous determining caused because phase rotation cannot be distinguished when the phase rotation sequence is detected, and reducing computational complexity. In addition, the terminal device may further obtain, based on a frame number of the radio frame n of the cell j and the SFN offset indication parameter of the cell i, a sequence initialization factor used by an NPRS on the radio frame m of the cell i, and obtain the NPRS on the radio frame m of the cell i based on the sequence initialization factor, thereby providing a way of determining the NPRS by using the SFN offset indication parameter of the cell i.

In a possible design, the sending, by the positioning server, the SFN offset indication parameter of the cell i to a terminal device includes: sending, by the positioning server, the SFN offset indication parameter to the terminal device by using an LTE Positioning Protocol LPP message. This design provides a way of sending, by the positioning server, the SFN offset indication parameter of the cell i to the terminal device, and a transmission mode is more flexible.

In a possible design, the obtaining, by a positioning server, an SFN offset indication parameter of a cell i includes: obtaining, by the positioning server, an SFN initialization moment of the cell i from the cell i, and obtaining an SFN initialization moment of the cell j from the cell j; and generating, by the positioning server, the SFN offset indication parameter of the cell i based on the SFN initialization moment of the cell i and the SFN initialization moment of the cell j. This design provides a way of obtaining the SFN offset indication parameter of the cell i.

In a possible design, the sending, by the positioning server, the SFN offset indication parameter of the cell i to a terminal device includes: sending, by the positioning server, the SFN offset indication parameter to the terminal device through the cell j by using an LTE Positioning Protocol A LPPa message. This design provides another way of sending, by the positioning server, the SFN offset indication parameter of the cell i to the terminal device, and a transmission mode is more flexible.

According to another aspect, an embodiment of the present application provides another system frame number SFN indication method, including: receiving, by a terminal device, an SFN offset indication parameter of a cell i from a positioning server, where the SFN offset indication parameter indicates a relative offset between an SFN of a radio frame m of the cell i and an SFN of a radio frame n of a cell j; obtaining, by the terminal device, a frame number $SFN_j$ of the radio frame n of the cell j; and determining, by the terminal device, a phase rotation parameter of the cell i based on the frame number $SFN_j$ of the radio frame n of the cell j and the SFN offset indication parameter of the cell i; or obtaining, based on the frame number $SFN_j$ of the radio frame n of the cell j and the SFN offset indication parameter of the cell i, a sequence initialization factor $c_{init}$ used by a narrowband positioning reference signal NPRS on the radio frame m of the cell i, and obtaining the NPRS on the radio frame m of the cell i based on the sequence initialization factor $c_{init}$ of the cell i. According to the SFN indication method provided in this embodiment of the present application, the positioning server obtains the relative offset between the SFN of the cell i and the SFN of the cell j, and then the terminal device determines the phase rotation parameter of the cell i based on the relative offset, so as to obtain a phase rotation sequence based on the phase rotation parameter. Therefore, the terminal device can detect an NSSS sequence of the cell i based on the determined phase rotation parameter, without a need of detecting the phase rotation sequence, thereby avoiding erroneous determining caused because phase rotation cannot be distinguished when the phase rotation sequence is detected, and reducing computational complexity. In addition, the terminal device may further obtain, based on the frame number of the radio frame n of the cell j and the SFN offset indication parameter of the cell i, the sequence initialization factor used by the NPRS on the radio frame m of the cell i, and obtain the NPRS on the radio frame m of the cell i based on the sequence initialization factor, thereby providing a way of determining the NPRS by using the SFN offset indication parameter of the cell i.

In a possible design, the SFN offset indication parameter is obtained by the positioning server based on an SFN initialization moment of the cell i and an SFN initialization moment of the cell j. This design provides a way of obtaining the SFN offset indication parameter of the cell i.

In a possible design, the receiving, by a terminal device, an SFN offset indication parameter of a cell i from a positioning server includes: receiving, by the terminal device, the SFN offset indication parameter from the positioning server by using an LTE Positioning Protocol LPP message. This design provides a way of sending, by the positioning server, the SFN offset indication parameter of the cell i to the terminal device, and a transmission mode is more flexible.

In a possible design, the receiving, by a terminal device, an SFN offset indication parameter of a cell i from a positioning server includes: receiving, by the terminal device by using an LTE Positioning Protocol A LPPa message, the SFN offset indication parameter sent by the positioning server through the cell j. This design provides another way of sending, by the positioning server, the SFN offset indication parameter of the cell i to the terminal device, and a transmission mode is more flexible.

In a possible design, the determining, by the terminal device, a phase rotation parameter of the cell i based on the frame number $SFN_j$ of the radio frame n of the cell j and the SFN offset indication parameter of the cell i includes: if a phase rotation parameter of an NSSS transmitted by the cell j on the radio frame n is $\theta_f = 33/132(SFN_j/2) \bmod 4$, and if the SFN offset indication parameter SFN_offset of the cell i is an odd number, determining, by the terminal device, that a phase rotation parameter $\theta'_f$ used by an NSSS received on a next radio frame of the radio frame m of the cell i is as follows:

$$\theta'_f = \frac{33}{132}\left\{\left[\frac{132}{33}\theta_f - \left(\frac{\text{SFN\_offset}_i - 1}{2}\right)\right]\bmod 4\right\};$$

or if the SFN offset indication parameter SFN_offset of the cell i is an even number, determining, by the terminal device, that a phase rotation parameter $\theta'_f$ used by an NSSS received on the radio frame m of the cell i is as follows:

$$\theta'_f = \frac{33}{132}\left\{\left[\frac{132}{33}\theta_f - \frac{\text{SFN\_offset}_i}{2}\right]\bmod 4\right\}.$$

This design specifically provides a way of determining the phase rotation parameter of the cell i based on the frame number of the radio frame n of the cell j and the SFN offset indication parameter of the cell i.

In a possible design, the obtaining, based on the frame number $SFN_j$ of the radio frame n of the cell j and the SFN offset indication parameter of the cell i, a sequence initialization factor $c_{init}$ used by a narrowband positioning reference signal NPRS on the radio frame m of the cell i includes: obtaining, by the terminal device, the sequence initialization factor $c_{init}$ based on $c_{init} = 2^{10} \cdot (\alpha \cdot n'_f + 7 \cdot (n_s+1) + l + 1) \cdot (2 \cdot N_{ID}^{Ncell} + 1) + 2 \cdot N_{ID}^{Ncell} + N_{CP}$, where $n'_f = (SFN_j + SFN\_offset_i) \bmod K$, $\alpha$ is a weighting factor, K is a seed cycle, $n_s$ is a slot number of a slot in which an orthogonal frequency division multiplexing OFDM symbol is located, l is a physical symbol sequence number of the OFDM symbol, $N_{ID}^{cell}$ is a cell identifier of the cell i, and $N_{CP}$ is a parameter related to a cyclic prefix. This design specifically provides a way of determining, based on the SFN initialization moment of the cell j and the SFN initialization moment of the cell i, the sequence initialization factor used by the NPRS of the cell i.

According to still another aspect, an embodiment of the present application provides a positioning server, including: a processing unit, configured to obtain an SFN offset indication parameter of a cell i, where the SFN offset indication parameter indicates a relative offset between an SFN of a radio frame m of the cell i and an SFN of a radio frame n of a cell j; and a sending unit, configured to send, to a terminal device, the SFN offset indication parameter of the cell i that is obtained by the processing unit.

According to yet another aspect, an embodiment of the present application provides a terminal device, including:

a receiving unit, configured to receive an SFN offset indication parameter of a cell i from a positioning server, where the SFN offset indication parameter indicates a relative offset between an SFN of a radio frame m of the cell i and an SFN of a radio frame n of a cell j; and a processing unit, configured to: obtain a frame number $SFN_j$ of the radio frame n of the cell j; and determine a phase rotation parameter of the cell i based on the frame number $SFN_j$ of the radio frame n of the cell j and the SFN offset indication parameter of the cell i that is received by the receiving unit; or obtain, based on the frame number $SFN_j$ of the radio frame n of the cell j and the SFN offset indication parameter of the cell i, a sequence initialization factor $c_{init}$ used by a narrowband positioning reference signal NPRS on the radio frame m of the cell i, and obtain the NPRS on the radio frame m of the cell i based on the sequence initialization factor $c_{init}$ of the cell i.

According to this embodiment provided in this application, in a possible design, a time difference between a start moment of the radio frame m of the cell i and a start moment of the radio frame n of the cell j is less than a time length of one radio frame. This design provides a time location relationship between the radio frame m of the cell i and the radio frame n of the cell j.

According to this embodiment provided in this application, in a possible design, an initialization moment of the radio frame m of the cell i is later than an initialization moment of the radio frame n of the cell j. This design further provides the time location relationship between the radio frame m of the cell i and the radio frame n of the cell j.

According to this embodiment provided in this application, in a possible design, when the cell j is a serving cell of the terminal device, the SFN of the radio frame n of the cell j is determined by the terminal device based on a synchronization signal and/or broadcast information sent by the cell j. This design provides a way of obtaining the SFN of the radio frame n of the cell j.

According to this embodiment provided in this application, in a possible design, the SFN offset indication parameter of the cell i is $$SFN\_offset_i = \left\lfloor \frac{t_i - t_j}{T} \right\rfloor \bmod N,$$

where $t_j$ is the SFN initialization moment of the cell j, $t_i$ is the SFN initialization moment of the cell i, T is the time length of the radio frame, N is a positive integer and indicates a maximum indication range of the SFN offset indication parameter, and $\lfloor\,\rfloor$ is a rounding down operation. This design specifically provides a way of determining the SFN offset indication parameter of the cell i based on the SFN initialization moment of the cell j and the SFN initialization moment of the cell i.

According to still another aspect, an embodiment of the present application provides still another system frame number SFN indication method, including: measuring, by a terminal device, an NSSS of a cell i to obtain a phase rotation parameter $\theta_{f,i}$ of the cell i, where the phase rotation parameter $\theta_{f,i}$ of the cell i is a phase rotation parameter of an NSSS on a first complete radio frame of the cell i, and the first complete radio frame carries the NSSS and is after an initialization moment of a radio frame (SFN=0) of a serving cell of the terminal device; obtaining, by the terminal device, an SFN offset indication parameter of the cell i based on the phase rotation parameter $\theta_{f,i}$ of the cell i; sending, by the terminal device, the SFN offset indication parameter of the cell i to a positioning server; and receiving, by the terminal device, a check result obtained after the positioning server performs check based on the SFN offset indication parameter of the cell i. According to the SFN indication method provided in this embodiment of the present application, the terminal device first measures the NSSS of the cell i to obtain the phase rotation parameter $\theta_{f,i}$ of the cell i, and then obtains the SFN offset indication parameter of the cell i based on the phase rotation parameter $\theta_{f,i}$. After the terminal device sends the SFN offset indication parameter of the cell i to the positioning server, the positioning server checks the SFN offset indication parameter of the cell i from the terminal device, to verify whether the phase rotation parameter $\theta_{f,i}$ of the cell i that is obtained by the terminal device through measurement is correct, and feeds back the result to the terminal device, so that the terminal device learns whether a measurement result is correct, thereby avoiding erroneous determining. This avoids erroneous determining caused because phase rotation cannot be distinguished when a phase rotation sequence is detected.

In a possible design, the obtaining, by the terminal device, an SFN offset indication parameter of the cell i based on the phase rotation parameter $\theta_{f,i}$ of the cell i includes: if a time difference between an initialization moment of a radio frame that is of the cell i and that carries the NSSS and the initialization moment of the radio frame (SFN=0) of the serving cell is greater than a time difference threshold $T_{threshold}$, determining that the SFN offset indication parameter of the cell i is SFN_offset$_i=\theta_{f,i}\times132/33\times2+1$; otherwise, determining that the SFN offset indication parameter of the cell i is SFN_offset$_i=\theta_{f,i}\times132/33\times2+1$. This design specifically provides a way of obtaining the SFN offset indication parameter of the cell i based on the phase rotation parameter of the cell i.

In a possible design, the sending, by the terminal device, the SFN offset indication parameter of the cell i to a positioning server includes: sending, by the terminal device, the SFN offset indication parameter of the cell i to the positioning server by using an LTE Positioning Protocol LPP message. This design specifically provides a way of sending the SFN offset indication parameter of the cell i to the positioning server, and a transmission mode is more flexible.

According to still another aspect, an embodiment of the present application provides a system frame number SFN indication method, including: receiving, by a positioning server, an SFN offset indication parameter of a cell i from a terminal device, where the SFN offset indication parameter of the cell i is obtained by the terminal device based on a phase rotation parameter $\theta_{f,i}$ of the cell i, the phase rotation parameter $\theta_{f,i}$ of the cell i is obtained by the terminal device by measuring an NSSS of the cell i, the phase rotation parameter $\theta_{f,i}$ of the cell i is a phase rotation parameter of an NSSS on a first complete radio frame of the cell i, and the first complete radio frame carries the NSSS and is after an initialization moment of a radio frame (SFN=0) of a serving cell of the terminal device; checking, by the positioning server, the SFN offset indication parameter of the cell i from the terminal device, to obtain a check result; and feeding back, by the positioning server, the check result to the terminal device. According to the SFN indication method provided in this embodiment of the present application, the terminal device first measures the NSSS of the cell i to obtain the phase rotation parameter $\theta_{f,i}$ of the cell i, and then obtains the SFN offset indication parameter of the cell i based on the phase rotation parameter $\theta_{f,i}$. After the terminal device sends the SFN offset indication parameter of the cell i to the positioning server, the positioning server checks the SFN offset indication parameter of the cell i from the terminal device, to verify whether the phase rotation parameter $\theta_{f,i}$ of the cell i that is obtained by the terminal device through measurement is correct, and feeds back the result to the terminal device, so that the terminal device learns whether a measurement result is correct, thereby avoiding erroneous determining. This avoids erroneous determining caused because phase rotation cannot be distinguished when a phase rotation sequence is detected.

In a possible design, the checking, by the positioning server, the SFN offset indication parameter of the cell i from the terminal device includes: performing, by the positioning server, check by using the SFN offset indication parameter of the cell i from the terminal device and an SFN offset indication parameter of the cell i that is calculated by the positioning server, to verify whether the phase rotation parameter $\theta_{f,i}$ of the cell i that is obtained by the terminal device through measurement is correct. This design specifically provides a way of checking the SFN offset indication parameter of the cell i from the terminal device, so as to indirectly verify whether the phase rotation parameter $\theta_{f,i}$ of the cell i that is obtained by the terminal device through measurement is correct.

In a possible design, that the terminal device sends the SFN offset indication parameter of the cell i to the positioning server includes: receiving, by the positioning server, the SFN offset indication parameter of the cell i from the terminal device by using an LPP message. This design specifically provides a way of sending the SFN offset indication parameter of the cell i to the positioning server, and a transmission mode is more flexible.

According to still another aspect, an embodiment of the present application provides a terminal device. The terminal device can implement functions performed by the terminal device in the foregoing method examples. The functions may be implemented by hardware, or may be implemented by hardware by executing corresponding software. The hardware or the software includes one or more modules corresponding to the foregoing functions.

In a possible design, a structure of the terminal device includes a processor and a transceiver. The processor is configured to support the terminal device in performing a corresponding function in the foregoing methods. The transceiver is configured to support the terminal device in communicating with another network element. The terminal device may further include a memory. The memory is configured to be coupled with the processor, and the memory stores a program instruction and data that are necessary for the terminal device.

According to still another aspect, an embodiment of the present application provides a positioning server. The positioning server can implement functions performed by the positioning server in the foregoing method embodiments. The functions may be implemented by hardware, or may be implemented by hardware by executing corresponding software. The hardware or the software includes one or more modules corresponding to the foregoing functions.

In a possible design, a structure of the positioning server includes a processor and a transceiver. The processor is configured to support the positioning server in performing a corresponding function in the foregoing methods. The transceiver is configured to support the positioning server in communicating with another network element. The positioning server may further include a memory. The memory is configured to be coupled with the processor, and the memory stores a program instruction and data that are necessary for the positioning server.

According to still another aspect, an embodiment of the present application provides a positioning system. The system includes an apparatus that can implement a function of the terminal device in the foregoing aspects and an apparatus that can implement a function of the positioning server in the foregoing aspects.

According to yet another aspect, an embodiment of the present application provides a computer storage medium, configured to store a computer software instruction used by the foregoing terminal device, where the computer software instruction includes a program designed for performing the foregoing aspects.

According to yet another aspect, an embodiment of the present application provides a computer storage medium, configured to store a computer software instruction used by the foregoing positioning server, where the computer software instruction includes a program designed for performing the foregoing aspects.

Compared with the prior art, in the solutions provided in the embodiments of the present application, the positioning server obtains the relative offset between the SFN of the cell i and the SFN of the cell j, and then the terminal device determines the phase rotation parameter of the cell i based on the relative offset, so as to obtain the phase rotation sequence based on the phase rotation parameter. Therefore, the terminal device can detect the NSSS sequence of the cell i based on the determined phase rotation parameter, without a need of detecting the phase rotation sequence, thereby avoiding erroneous determining caused because phase rotation cannot be distinguished when the phase rotation sequence is detected. Similarly, the terminal device determines the sequence initialization factor of the narrowband positioning reference signal NPRS of the cell i based on the relative offset, so as to determine the NPRS. Therefore, the terminal device can detect, based on the determined NPRS, the NPRS sent by the cell i, thereby avoiding erroneous detection determining and high computational complexity that are caused when a specific NPRS is not known.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

FIG. 8 is another schematic diagram of SFN initialization moments of a cell i and a cell j according to an embodiment of the present application;

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 2:
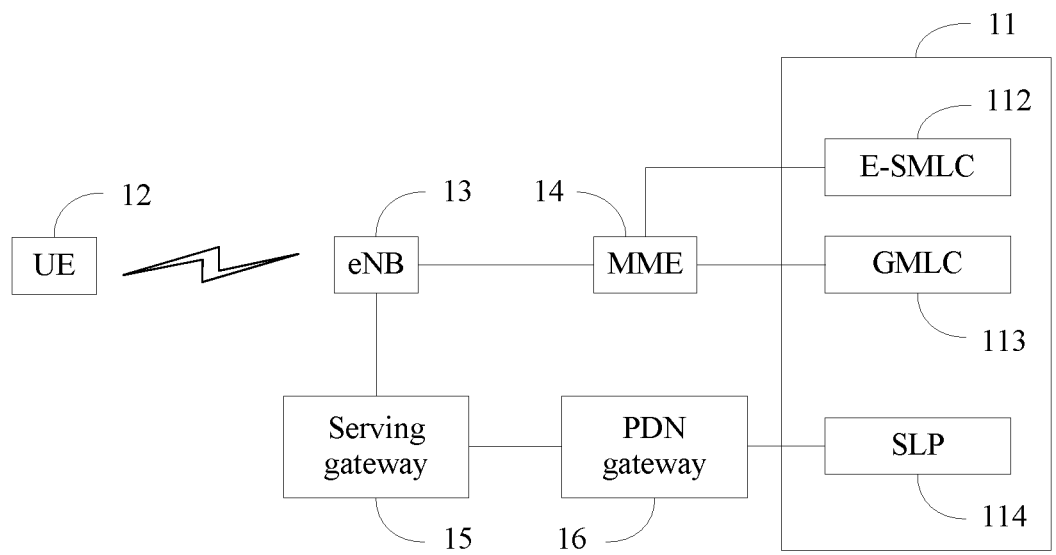
FIG. 2 is a schematic diagram of a positioning system according to an embodiment of the present application.

An embodiment of the present application provides a positioning system. As shown in FIG. 2, the positioning system includes a positioning server 11, a terminal device 12, an eNB 13, an MME (mobility management entity) 14, a serving gateway 15, and a PDN (packet data network) gateway 16. The positioning server 11 is a network-side entity that is specially configured to support a positioning function. In a control plane positioning solution, the positioning server is an E-SMLC (evolved serving mobile location center) 112 or a GMLC (gateway mobile location center). However, in a user plane positioning solution, the positioning server is an SLP (SUPL (secure user plane location) platform). In addition, the MME 14 is responsible for signaling processing between a core network and the terminal device 12. The serving gateway 15 and the PDN gateway 16 are responsible for data packet forwarding.

Figure 3:
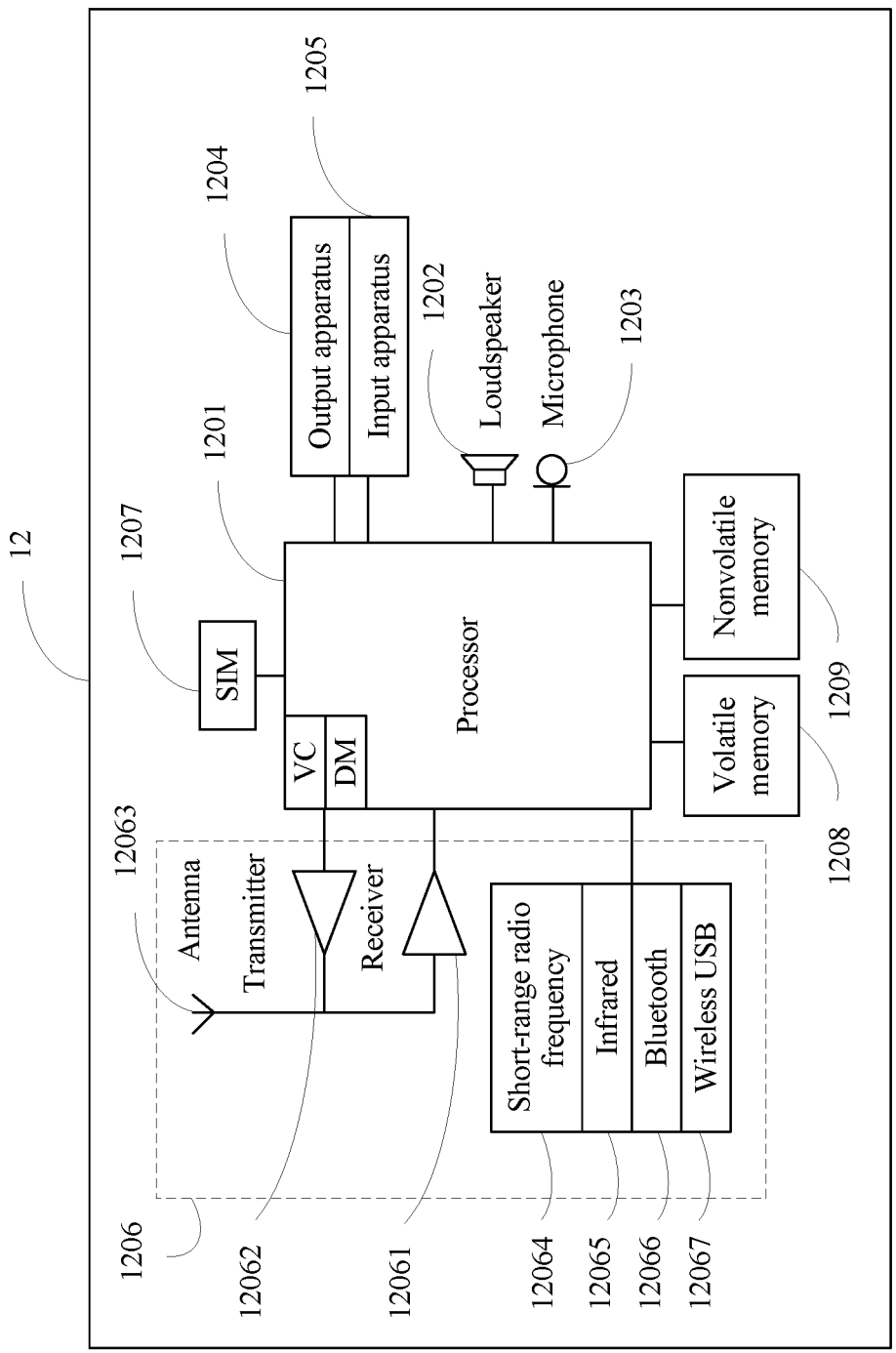
FIG. 3 is a schematic structural diagram of a terminal device according to an embodiment of the present application.

As shown in FIG. 3, the terminal device 12 may include a processor 1201, and the processor 1201 may include a circuit used for audio/video and logical functions of the terminal device 12. For example, the processor 1201 may include a digital signal processor, a microprocessor, an analog-to-digital converter, and a digital-to-analog converter. Control and signal processing functions of a mobile device may be allocated between these devices based on respective capabilities of the devices. The processor may further include an internal voice coder VC 12011, an internal data modem DM 12012, and the like. In addition, the processor 1201 may include functions for operating one or more software programs, and the software programs may be stored in a memory. Usually, the processor and the stored software programs may be configured to enable the terminal device 12 to perform an action. For example, the processor can operate a connection program.

The terminal device 12 may further include a user interface. The user interface may include, for example, a headset or loudspeaker 1202, a microphone 1203, an output apparatus (for example, a display) 1204, and an input apparatus 1205. The user interface may be coupled with the processor through an operation. In this case, the processor 1201 may include a user interface circuit, configured to control at least some functions of one or more elements (for example, the loudspeaker, the microphone, and the display) of the user interface. The processor and/or the user interface circuit included in the processor may be configured to control one or more functions of the one or more elements of the user interface by using a computer program instruction (for example, software and/or firmware) stored in a memory accessible to the processor. Although not shown, the terminal device 12 may include a battery configured to supply power to various circuits related to the mobile device. The circuit is, for example, a circuit that provides mechanical vibration and uses the mechanical vibration as detectable output. The input apparatus may include a device that allows the apparatus to receive data, such as a keypad, a touch display, a joystick, and/or at least one another input device.

The terminal device 12 may further include one or more connection circuit modules 1206 configured to share and/or obtain data. For example, the terminal device 12 may include a receiver 12061 and a transmitter 12062 that are connected to an antenna 12063 to respectively receive an RF signal and send an RF signal. The terminal device 12 may include a short-range radio frequency RF transceiver and/or detector 12064, so as to share data with and/or obtain data from an electronic device based on an RF technology. The terminal device 12 may include other short-range transceivers, such as an infrared IR transceiver 12065, a Bluetooth transceiver 12066, and a wireless universal serial bus USB transceiver 12067. The Bluetooth transceiver 12066 can operate based on a low-power or an ultra-low-power Bluetooth technology. In this case, the terminal device 12, more specifically, the short-range transceiver can send data to and/or receive data from an electronic device near the apparatus (for example, within 10 meters). Although not shown, the terminal device 12 can send data to and/or receive data from the electronic device based on various wireless networking technologies, and these technologies include: Wi-Fi, Wi-Fi low power, and WLAN technologies, such as an IEEE 802.11 technology, an IEEE 802.15 technology, and an IEEE 802.16 technology.

The terminal device 12 may include a memory that can store an information element related to a mobile user, such as a subscriber identity module SIM 1207. In addition to the SIM 1207, the apparatus may further include another removable and/or fixed memory. The terminal device 12 may include a volatile memory 1208 and/or a nonvolatile memory 1209. For example, the volatile memory may include a random access memory RAM, and the RAM includes a dynamic RAM and/or a static RAM, and an on-chip and/or off-chip cache. The nonvolatile memory may be embedded and/or removable. The nonvolatile memory may include, for example, a read-only memory, a flash memory, a magnetic storage device such as a hard disk, a floppy disk drive, or a magnetic tape, an optical disk drive and/or a medium, and a nonvolatile random access memory NVRAM. Similar to the volatile memory, the nonvolatile memory may include a cache area used for temporary storage of data. At least a part of the volatile memory and/or the nonvolatile memory may be embedded in the processor. The memory may store one or more software programs, instructions, information blocks, data, and the like. The memory may be used by the terminal device 12 to perform a function of a mobile terminal. For example, the memory may include an identifier that can uniquely identify the terminal device 12, such as an international mobile equipment identity IMEI.

Figure 4:
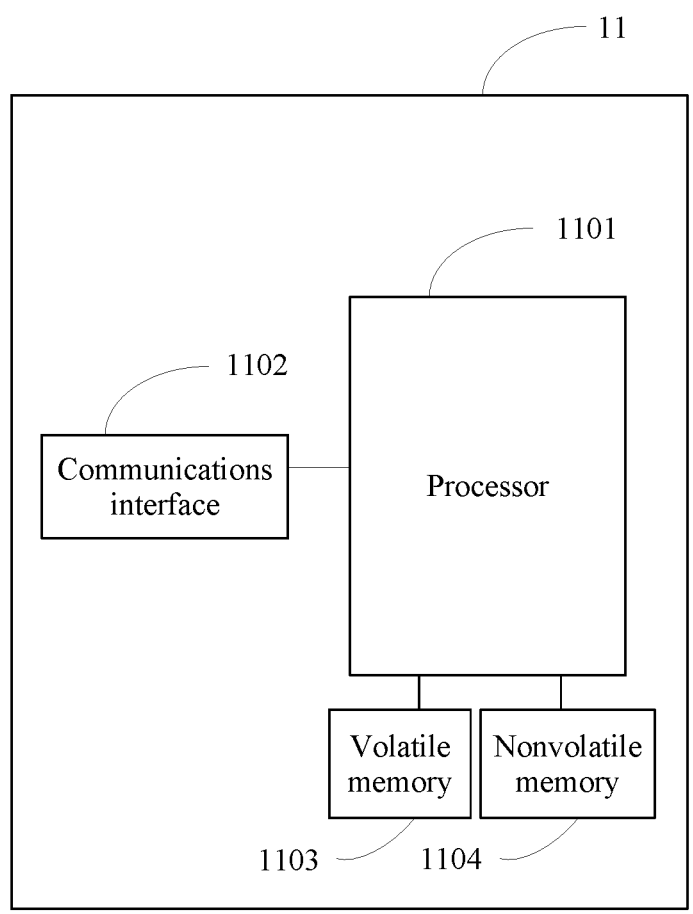
FIG. 4 is a schematic structural diagram of a positioning server according to an embodiment of the present application.

As shown in FIG. 4, the positioning server 11 includes a processor 1101, a communications interface 1102, a volatile memory 1103, and a nonvolatile memory 1104. The communications interface 1102 is used by the positioning server 11 to communicate with another communications device. For example, the communications interface 1102 may include an Ethernet interface, and a wired or wireless network interface. The volatile memory 1103 may include a random access memory RAM, and the RAM includes a dynamic RAM and/or a static RAM, an on-chip and/or off-chip cache, and the like. The nonvolatile memory 1104 may be embedded and/or removable. The nonvolatile memory 1104 may include, for example, a read-only memory, a flash memory, a magnetic storage device such as a hard disk, a floppy disk drive, or a magnetic tape, an optical disk drive and/or a medium, and a nonvolatile random access memory NVRAM. Similar to the volatile memory 1103, the nonvolatile memory 1104 may include a cache area used for temporary storage of data. At least a part of the volatile memory and/or the nonvolatile memory may be embedded in the processor 1101. The memory may store one or more software programs, instructions, information blocks, data, and the like. The memory may be used by the positioning server 11 to perform a function of the positioning server.

According to an SFN indication method, the terminal device, and the positioning server and system provided in the embodiments of the present application, an SFN offset between an SFN of a cell i and an SFN of a cell j is obtained, and a phase rotation parameter of an NSSS is generated by using the SFN offset and the SFN of the cell j. Because the SFN of the cell i and the SFN of the cell j are determined, the generated SFN offset and the finally generated phase rotation parameter of the NSSS are also determined, so that the terminal device may detect an NSSS sequence of the cell i based on the determined phase rotation parameter, and does not need to detect a phase rotation sequence, thereby avoiding erroneous determining caused because phase rotation cannot be distinguished when the phase rotation sequence is detected. It should be noted that, for any positioning design that requires SFN information, an SFN may also be indicated by using the method provided in the present application.

Figure 5:
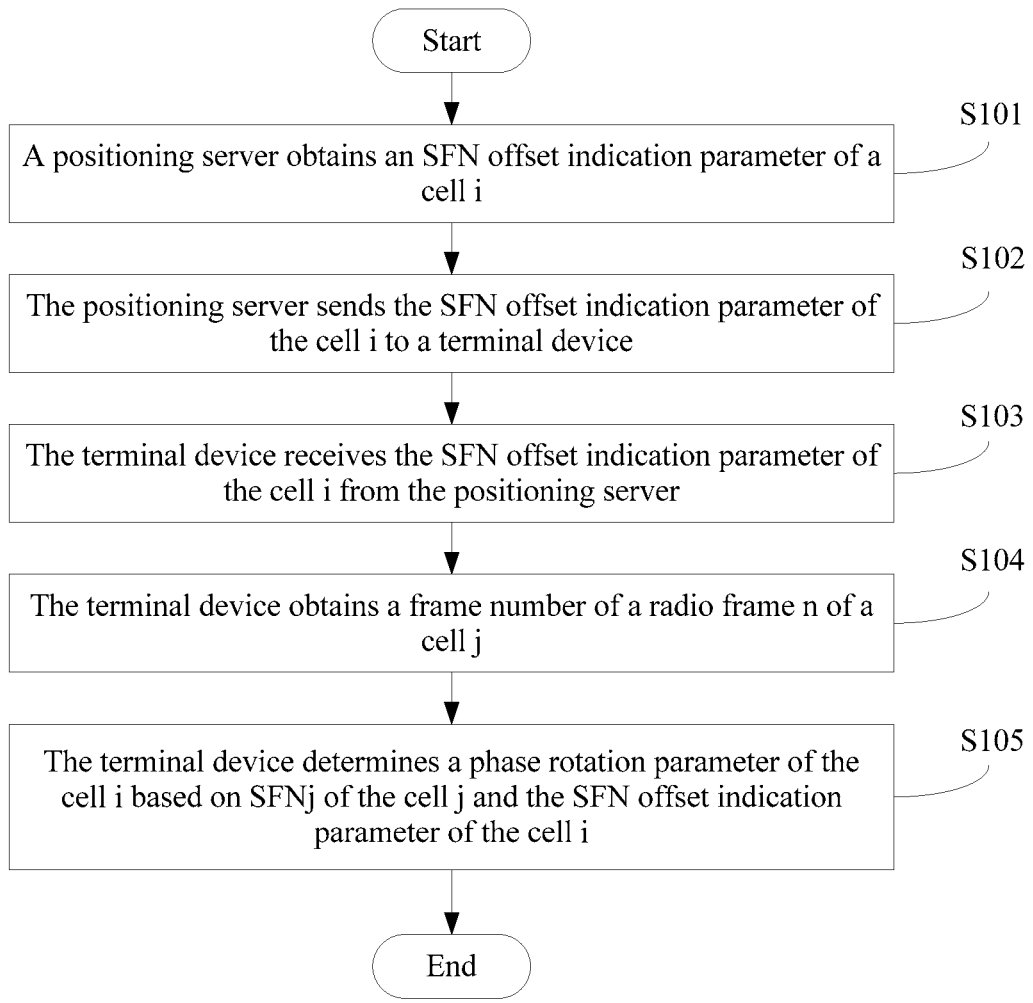
FIG. 5 is a schematic flowchart of an SFN indication method according to an embodiment of the present application.

An embodiment of the present application provides an SFN indication method, applied to the foregoing positioning system. As shown in FIG. 5, the method includes the following steps.

S101. A positioning server obtains an SFN offset indication parameter of a cell i, where the SFN offset indication parameter indicates a relative offset between an SFN of a radio frame m of the cell i and an SFN of a radio frame n of a cell j.

The cell j may be a serving cell in which a terminal device is located, or may be another cell selected as an SFN reference.

Figure 6:
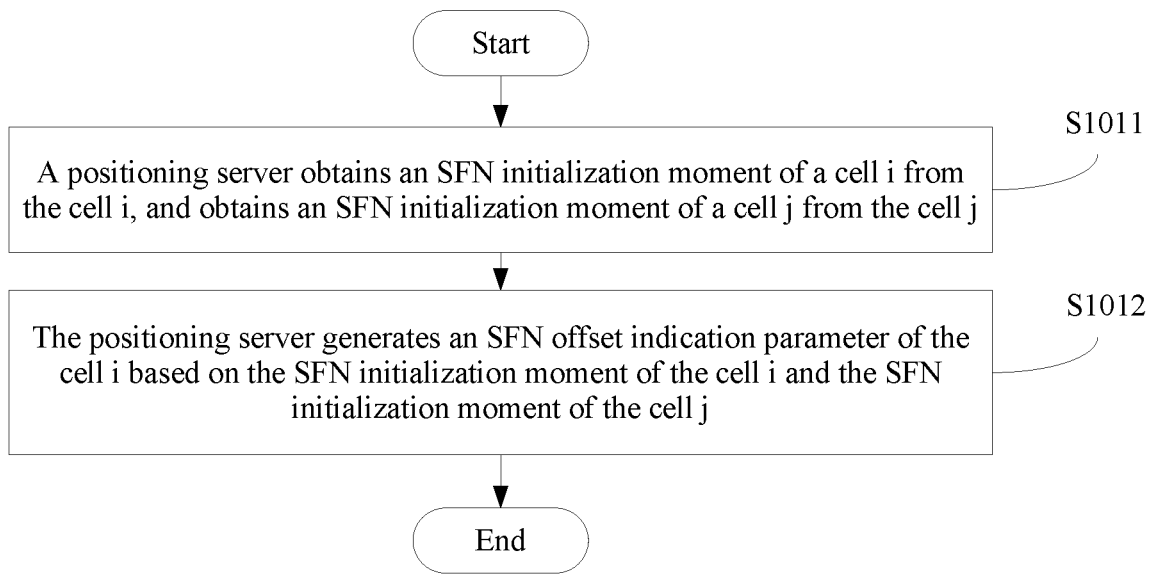
FIG. 6 is a schematic flowchart of obtaining an SFN offset indication parameter of a cell i according to an embodiment of the present application.

Specifically, the SFN offset indication parameter of the cell i may be obtained based on a configuration, and the obtained relative offset is fixed. Alternatively, as shown in FIG. 6, the SFN offset indication parameter of the cell i may be automatically obtained by performing step S1011 and step S1012. This is more flexible compared with the foregoing fixed configuration.

S1011. The positioning server obtains an SFN initialization moment of the cell i from the cell i, and obtains an SFN initialization moment of the cell j from the cell j.

An example in which the positioning server is an E-SMLC is used for description. According to existing protocol specifications, when the E-SMLC collects, from each to-be-measured cell, related information required for supporting OTDOA positioning, each cell reports one piece of SFN-related information to the E-SMLC. The parameter is "SFNInitializationTime", and the parameter indicates a moment at which an SFN of the cell is initialized to 0 and that uses a unit of a second.

S1012. The positioning server generates the SFN offset indication parameter of the cell i based on the SFN initialization moment of the cell i and the SFN initialization moment of the cell j.

The example in which the positioning server is an E-SMLC is still used for description. The E-SMLC determines the SFN offset indication parameter of the cell i for the cell i. The SFN offset indication parameter indicates the relative offset between the SFN of the radio frame m of the cell i and the SFN of the radio frame n of the cell j based on the radio frame n of the cell j. In other words, the SFN offset indication parameter indicates a difference between the SFN of the radio frame n of the cell j and the SFN of the first complete radio frame m of the cell i after the initialization moment of the radio frame. The radio frame m of the cell i is the first complete radio frame after the initialization moment of the radio frame n of the cell j. A time difference between a start moment of the radio frame m of the cell i and a start moment of the radio frame n of the cell j is less than a time length of one radio frame, and the initialization moment of the radio frame m of the cell i is later than the initialization moment of the radio frame n of the cell j. The SFN offset indication parameter may be determined by using the following formula based on the SFN initialization moment reported by the cell j and the SFN initialization moment reported by the cell i:

$$\text{SFN\_offset}_i = \left\lfloor \frac{t_j - t_i}{T} \right\rfloor \bmod N,$$

where

SFN_offset$_i$ is the SFN offset indication parameter of the cell i; $t_j$ is the SFN initialization moment of the cell j that is reported by the cell j; $t_i$ is the SFN initialization moment of the cell i that is reported by the cell i; T is the time length of the radio frame, and for LTE, T=0.01 seconds; N is a positive integer and indicates a maximum indication range of the SFN offset indication parameter, and for the LTE, N=8; and $\lfloor \ \rfloor$ is a rounding down operation.

Figure 7:
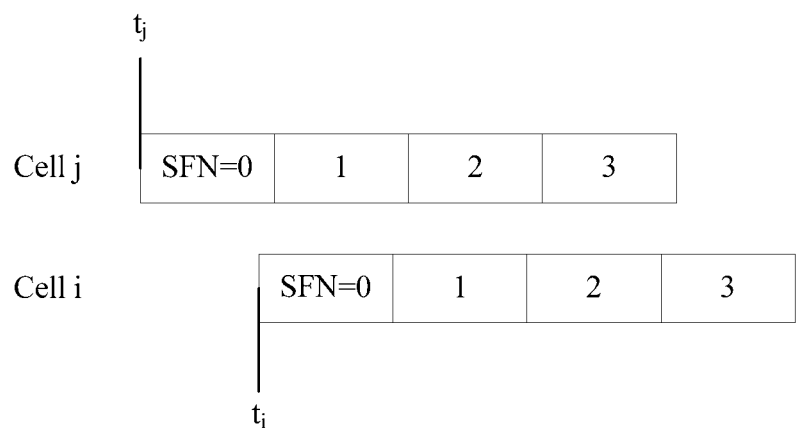
FIG. 7 is a schematic diagram of SFN initialization moments of a cell i and a cell j according to an embodiment of the present application.

For an example in FIG. 7, it is assumed that 0 to 3 in the figure represent SFNs, and $t_j-t_i$ is less than the time length T of one radio frame. Therefore, a value of $$\left\lfloor \frac{t_j - t_i}{T} \right\rfloor$$

is 0, and a value of SFN_offset$_i$ is 0.

Optionally, when the cell j is a serving cell of the terminal device, the SFN of the radio frame n of the cell j is determined by the terminal device based on a synchronization signal and/or broadcast information sent by the cell j. For example, for the synchronization signal alone, the terminal device obtains the SFN of the radio frame n of the cell j by detecting an NSSS sent by the cell j. For the broadcast information alone, the terminal device obtains the SFN of the radio frame n of the cell j by reading an SFN information field in an NPBCH (narrowband physical broadcast channel) of the cell j. For the synchronization signal and the broadcast information, the terminal device separately obtains corresponding SFN information from an NSSS and the broadcast information, to form the complete SFN of the radio frame n of the cell j. In addition, the E-SMLC may also determine, for the serving cell of the terminal device, that the SFN offset indication parameter is 0 by default. In other words, SFN_offset$_i$=0.

S102. The positioning server sends the SFN offset indication parameter of the cell i to a terminal device.

The example in which the positioning server is an E-SMLC is still used for description.

Optionally, the positioning server E-SMLC sends the SFN offset indication parameter of the cell i to the terminal device in a form of an LPP (LTE positioning protocol) message. The SFN offset indication parameter of the cell i corresponds to a cell ID (cell identifier) of the cell.

Optionally, the positioning server E-SMLC sends the SFN offset indication parameter of the cell i to the cell j in a form of an LPPa (LTE positioning protocol A) message, and the cell j sends the received SFN offset indication parameter together with the corresponding cell ID to the terminal device by using a broadcast message on the cell j.

S103. The terminal device receives the SFN offset indication parameter of the cell i from the positioning server.

S104. The terminal device obtains a frame number SFN$_j$ of the radio frame n of the cell j.

Specifically, the terminal device may obtain the frame number SFN$_j$ of the radio frame n of the cell j by using a downlink synchronization process with the cell j and reading the broadcast information of the cell j.

S105. The terminal device determines a phase rotation parameter of the cell i based on SFN$_j$ of the cell j and the SFN offset indication parameter of the cell i.

According to TS 36.211 stipulations, an NSSS of NB-IoT is transmitted in a subframe #9 in a radio frame that meets $n_f \bmod 2=0$ If the cell j transmits an NSSS on the radio frame n and a phase rotation parameter used by the NSSS is $\theta_f=33/132(SFN_j/2) \bmod 4$:

If the SFN offset indication parameter SFN_offset$_i$ of the cell i is an odd number, there is no NSSS on the radio frame m of the cell i. Therefore, it means that a next radio frame of the cell i carries the NSSS, so that the cell i sends the NSSS on the next radio frame of the radio frame m, and a phase rotation parameter used by the NSSS is $$\theta'_f = \frac{33}{132}\left\{\left[\frac{132}{33}\theta_f - \left(\frac{SFN\_offset_i - 1}{2}\right)\right] \bmod 4\right\}.$$

Therefore, a phase rotation parameter used by an NSSS on a subsequent radio frame can be inferred.

If the SFN offset indication parameter SFN_offset$_i$ of the cell i is an even number, the radio frame carries an NSSS, and a phase rotation parameter used by the NSSS is $$\theta'_f = \frac{33}{132}\left\{\left[\frac{132}{33}\theta_f - \frac{SFN\_offset_i}{2}\right] \bmod 4\right\}.$$

Therefore, a phase rotation parameter used by an NSSS on a subsequent radio frame can be inferred.

For example, as shown in FIG. 8, it is assumed that a phase rotation parameter $\theta_f$ of a radio frame 0 of the cell j is: (33/132)*0=0. An SFN of a first complete radio frame of the cell i after an initialization moment of the radio frame 0 (SFN=0) of the cell j is 7, SFN_offset$_i$ is 7, that is, an odd number, and a next radio frame (SFN=8) of the cell i carries an NSSS. Therefore, a phase rotation parameter used by the NSSS on the radio frame (SFN=8) of the cell i is:

$$\theta'_f = \frac{33}{132}\left\{\left[\frac{132}{33}\theta_f - \left(\frac{SFN\_offset_i - 1}{2}\right)\right] \bmod 4\right\} = $$
$$\frac{33}{132}\left\{\left[\frac{132}{33}*0 - \left(\frac{7-1}{2}\right)\right] \bmod 4\right\} = \frac{32}{132}*3.$$

By analogy, other values can be obtained: (33/132)*0, (33/132)*1, and (33/132)*2.

The terminal device may obtain a phase rotation sequence $e^{-j2\pi\theta_{f,i} n}$ based on the phase rotation parameter. When an NSSS sequence is detected, the phase rotation sequence does not need to be detected.

According to the SFN indication method provided in this embodiment of the present application, the positioning server obtains the relative offset between the SFN of the cell i and the SFN of the cell j, and then the terminal device determines the phase rotation parameter of the cell i based on the relative offset, so as to obtain the phase rotation sequence based on the phase rotation parameter. Therefore, the terminal device can detect the NSSS sequence of the cell i based on the determined phase rotation parameter, without a need of detecting the phase rotation sequence, thereby avoiding erroneous determining caused because phase rotation cannot be distinguished when the phase rotation sequence is detected, and reducing computational complexity.

Figure 9:
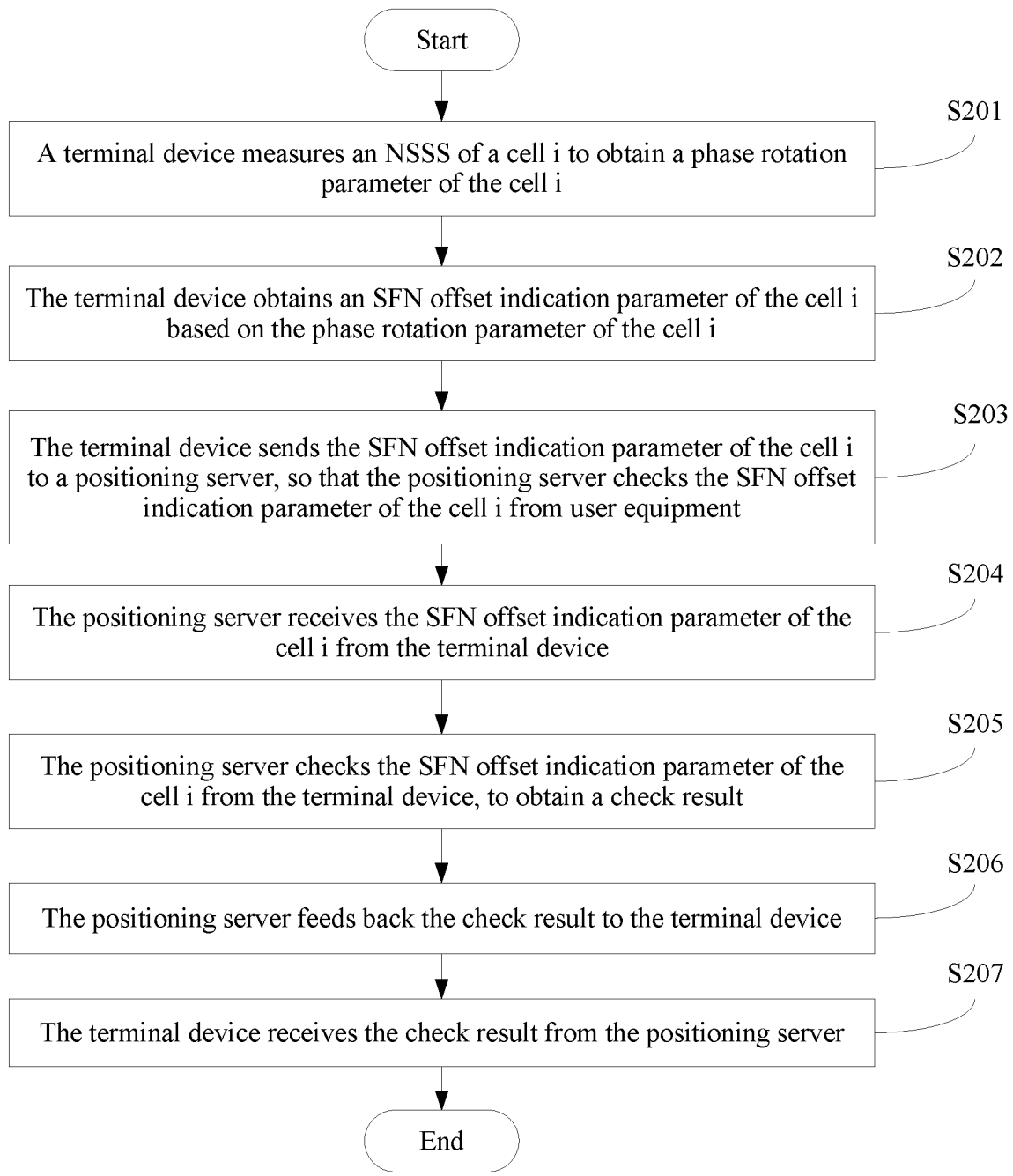
FIG. 9 is a schematic flowchart of another SFN indication method according to an embodiment of the present application.

An embodiment of the present application provides another SFN indication method, applied to the foregoing positioning system. As shown in FIG. 9, the method includes the following steps.

S201. A terminal device measures an NSSS of a cell i to obtain a phase rotation parameter $\theta_{f,i}$ of the cell i, where the phase rotation parameter $\theta_{f,i}$ of the cell i is a phase rotation parameter of an NSSS on a first complete radio frame of the cell i, and the first complete radio frame carries the NSSS and is after an initialization moment of a radio frame (SFN=0) of a serving cell of the terminal device.

In this case, the terminal device measures the NSSS of the cell i without knowing any SFN initialization moment, and determines the phase rotation parameter $\theta_{f,i}$ of the NSSS of the cell i during measurement.

S202. The terminal device obtains an SFN offset indication parameter of the cell i based on the phase rotation parameter $\theta_{f,i}$ of the cell i.

Specifically, if a time difference between an initialization moment of a radio frame that carries the NSSS in the cell i and the initialization moment of the radio frame (SFN=0) of the serving cell is greater than a time difference threshold $T_{threshold}$, the SFN offset indication parameter of the cell i is: SFN_offset$_i$=$\theta_{f,i}$×132/33×2+1.

Otherwise, the SFN offset indication parameter of the cell i is: SFN_offset$_i$=$\theta_{f,i}$×132/33×2.

S203. The terminal device sends the SFN offset indication parameter of the cell i to a positioning server.

Specifically, the terminal device sends the SFN offset indication parameter of the cell i to the positioning server by using an LPP message.

S204. The positioning server receives the SFN offset indication parameter of the cell i from the terminal device.

Specifically, the positioning server receives the SFN offset indication parameter of the cell i from the terminal device by using an LPP message.

S205. The positioning server checks the SFN offset indication parameter of the cell i from the terminal device, to obtain a check result.

Specifically, the positioning server performs check by using the SFN offset indication parameter of the cell i from the terminal device and an SFN offset indication parameter of the cell i that is calculated by the positioning server, to verify whether the phase rotation parameter $\theta_{f,i}$ of the cell i that is obtained by the terminal device through measurement is correct.

S206. The positioning server feeds back the check result to the terminal device.

S207. The terminal device receives the check result from the positioning server.

According to the SFN indication method provided in this embodiment of the present application, the terminal device first measures the NSSS of the cell i to obtain the phase rotation parameter $\theta_{f,i}$ of the cell i, and then obtains the SFN offset indication parameter of the cell i based on the phase rotation parameter $\theta_{f,i}$. After the terminal device sends the SFN offset indication parameter of the cell i to the positioning server, the positioning server checks the SFN offset indication parameter of the cell i from the terminal device, to verify whether the phase rotation parameter $\theta_{f,i}$ of the cell i that is obtained by the terminal device through measurement is correct, and feeds back the result to the terminal device, so that the terminal device learns whether a measurement result is correct, thereby avoiding erroneous determining. This avoids erroneous determining caused because phase rotation cannot be distinguished when a phase rotation sequence is detected.

Figure 10:
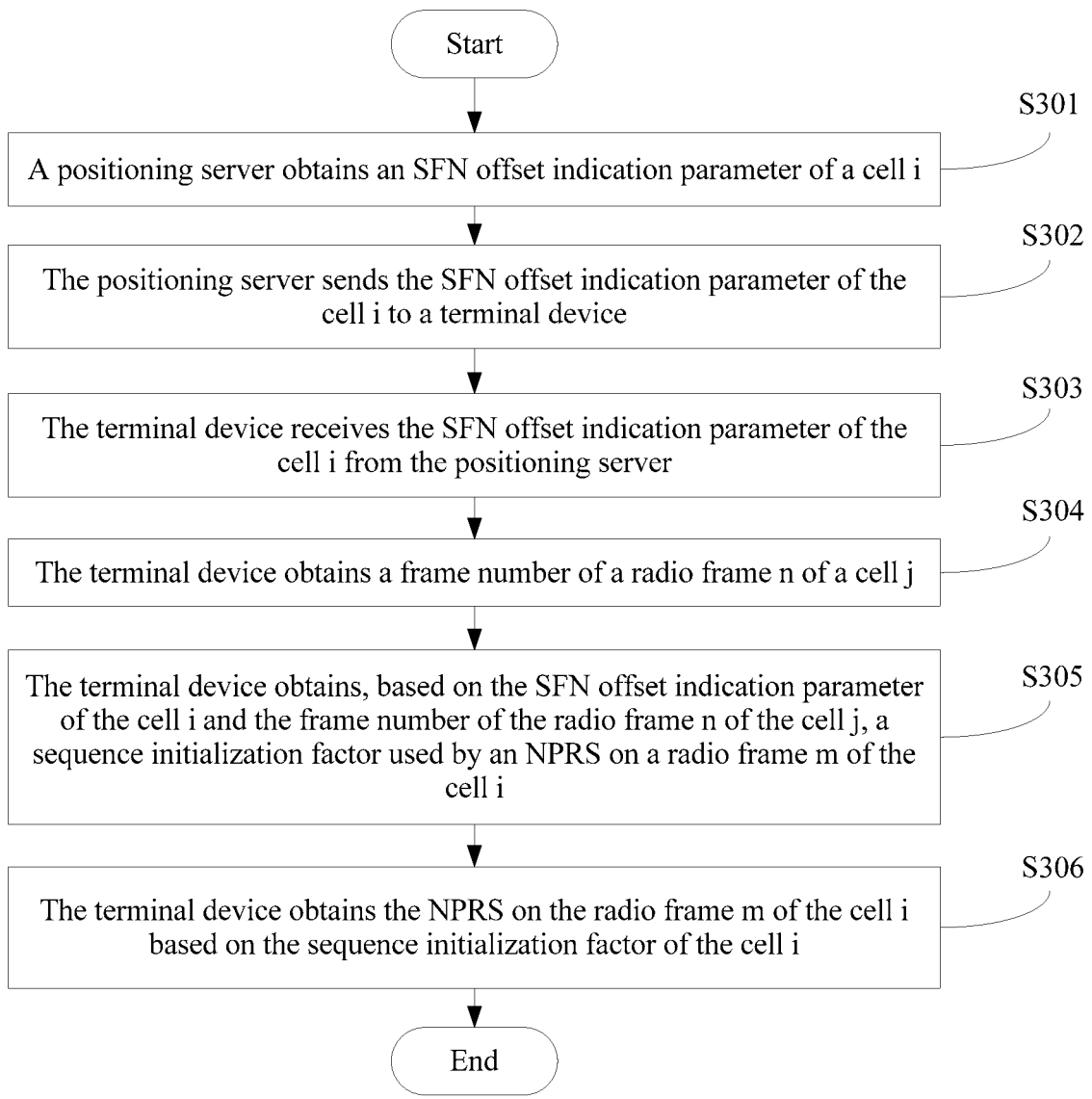
FIG. 10 is a schematic flowchart of still another SFN indication method according to an embodiment of the present application.

An embodiment of the present application provides another SFN indication method, applied to the foregoing positioning system. As shown in FIG. 10, the method includes the following steps.

S301. A positioning server obtains an SFN offset indication parameter SFN_offset$_i$ of a cell i, where the SFN offset indication parameter indicates a relative offset between an SFN of a radio frame m of the cell i and an SFN of a radio frame n of a cell j.

This step is the same as step S101, and details are not described herein again.

S302. The positioning server sends the SFN offset indication parameter SFN_offset$_i$ of the cell i to a terminal device.

This step is the same as step S102, and details are not described herein again.

S303. The terminal device receives the SFN offset indication parameter SFN_offset$_i$ of the cell i from the positioning server.

This step is the same as step S103, and details are not described herein again.

S304. The terminal device obtains a frame number SFN$_j$ of the radio frame n of the cell j.

This step is the same as step S104, and details are not described herein again.

S305. The terminal device obtains, based on the SFN offset indication parameter of the cell i and the frame number SFN$_j$ of the radio frame n of the cell j, a sequence initialization factor $c_{init}$ used by an NPRS (narrowband positioning reference signal) on the radio frame m of the cell i.

Currently, an NPRS sequence is generated based on a pseudo-random sequence generator. The pseudo-random sequence generator is initialized at a beginning of each OFDM (orthogonal frequency division multiplexing) symbol. The used initialization factor $c_{init}$ is related to a frame number SFN of a radio frame in which the OFDM symbol is located, that is, $c_{init}$=g(SFN), where g(·) is a mapping function from an SFN to $c_{init}$.

In the prior art, $$c_{init}=2^{10}\cdot(\alpha\cdot n'_f+7\cdot(n_s+1)+l+1)\cdot(2\cdot N_{ID}^{Ncell}+1)+2\cdot N_{ID}^{N-cell}+N_{CP}, \text{where}$$

n'$_f$=n$_f$ mod K, n$_f$ is the frame number SFN of the radio frame in which the OFDM symbol is located, $\alpha$ is a weighting factor, K is a seed cycle and may be a positive integer, n$_s$ is a slot number of a slot in which the OFDM symbol is located, l is a physical symbol sequence number of the OFDM symbol, $N_{ID}^{cell}$ is an identifier of the cell, $N_{CP}$ is a parameter related to a cyclic prefix, a value of $N_{CP}$ corresponding to a conventional CP (cyclic prefix) is 1, and a value of $N_{CP}$ corresponding to an extended CP is 0.

If the NPRS is sent on an OFDM symbol p on the radio frame m of the cell i, the terminal device may determine that the sequence initialization factor used to generate the NPRS signal on the OFDM symbol is $c_{init}$=g$_i$(SFN$_j$+SFN_offset$_i$), where g$_i$(·) is the mapping function from an SFN used by the cell i to $c_{init}$. In this embodiment of the present application, the sequence initialization factor is specifically as follows:

$$c_{init}=2^{10}\cdot(\alpha\cdot n'_f+7\cdot(n_s+1)+l+1)\cdot(2\cdot N_{ID}^{Ncell}+1)+2\cdot N_{ID}^{N-cell}+N_{CP}, \text{where}$$

n'$_f$=(SFN$_j$+SFN_offset$_i$)mod K, n$_s$ is a slot number of a slot in which the OFDM symbol is located, l is a physical symbol sequence number of the OFDM symbol, $N_{ID}^{cell}$ is a cell identifier of the cell i, $N_{CP}$ is a parameter related to a cyclic prefix, a value of $N_{CP}$ corresponding to a conventional CP is 1, and a value of $N_{CP}$ corresponding to an extended CP is 0.

S306. The terminal device obtains the NPRS on the radio frame m of the cell i based on the sequence initialization factor $c_{init}$ of the cell i.

For details, refer to step S305, and details are not described herein again.

According to the SFN indication method provided in this embodiment of the present application, the positioning server obtains the SFN offset indication parameter of the cell i, where the parameter indicates the relative offset between the SFN of the cell i and the SFN of the cell j, and then the terminal device determines, based on the relative offset and the frame number of the radio frame n of the cell j, the sequence initialization factor used by the NPRS on the radio frame m of the cell i, and obtains the NPRS on the radio frame m of the cell i based on the sequence initialization factor, thereby providing a way of determining the NPRS by using the SFN offset indication parameter of the cell i. The terminal device determines the sequence initialization factor of the narrowband positioning reference signal NPRS of the cell i based on the relative offset, so as to determine the NPRS. Therefore, the terminal device can detect, based on the determined NPRS, the NPRS sent by the cell i, thereby avoiding erroneous detection determining and high computational complexity that are caused when a specific NPRS is not known.

The foregoing mainly describes the solutions provided in the embodiments of the present application from a perspective of interaction between network elements. It may be understood that, to implement the foregoing functions, network elements such as the terminal device and the positioning server each include corresponding hardware structures and/or software modules for implementing the functions. A person skilled in the art should easily be aware that units and algorithm steps in the examples described with reference to the embodiments disclosed in this specification may be implemented in a form of hardware or a combination of hardware and computer software in the present application. Whether the functions are performed by hardware or computer software driving hardware depends on particular applications and design constraints of the technical solutions. A person skilled in the art may use different methods to implement the described functions for each particular application, but it should not be considered that the implementation goes beyond the scope of the present application.

In the embodiments of the present application, division of function modules may be performed on the terminal device, the positioning server, and the like according to the foregoing method examples. For example, function modules may be divided based on corresponding functions, or at least two functions may be integrated into one processing module. The integrated module may be implemented in a form of hardware, or may be implemented in a form of a software function module. It should be noted that the module division in the embodiments of the present application is an example, and is merely logical function division, and may be other division during actual implementation.

Figure 11:
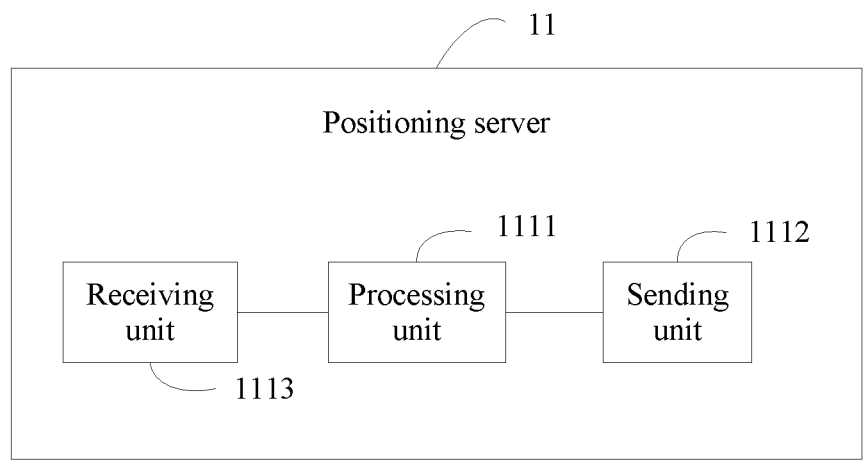
FIG. 11 is a schematic structural diagram of another positioning server according to an embodiment of the present application.

When the function modules are divided based on corresponding functions, FIG. 11 is a possible schematic structural diagram of a positioning server in the foregoing embodiments. The positioning server 11 includes a processing unit 1111, a sending unit 1112, and a receiving unit 1113. The processing unit 1111 is configured to support the positioning server 11 in performing process S101 in FIG. 5, processes S1011 and S1012 in FIG. 6, process S205 in FIG. 9, and process S301 in FIG. 10. The sending unit 1112 is configured to support the positioning server 11 in performing process S102 in FIG. 5, process S206 in FIG. 9, and process S302 in FIG. 10. The receiving unit 1113 is configured to support the positioning server 11 in performing process S204 in FIG. 9. All related content of steps in the foregoing method embodiments may be cited in function descriptions of corresponding function modules, and details are not described herein again.

Figure 12:
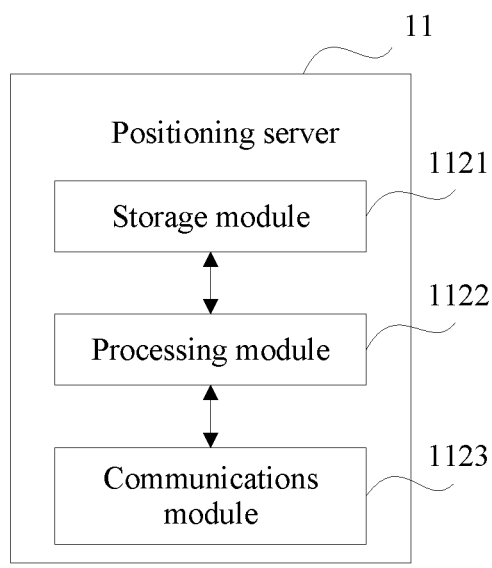
FIG. 12 is a schematic structural diagram of still another positioning server according to an embodiment of the present application.

When an integrated unit is used, FIG. 12 is a possible schematic structural diagram of a positioning server in the foregoing embodiments. The positioning server 11 includes a processing module 1122 and a communications module 1123. The processing module 1122 is configured to control and manage an action of the positioning server. For example, the processing module 1122 is configured to support the positioning server 11 in performing process S101 in FIG. 5, processes S1011 and S1012 in FIG. 6, process S205 in FIG. 9, and process S301 in FIG. 10. The communications module 1123 is configured to support the positioning server 11 in communicating with another network entity, for example, communicating with a function module or a network entity shown in FIG. 2. The positioning server 11 may further include a storage module 1121, configured to store program code and data of the positioning server.

The processing module 1122 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 1122 may implement or execute various example logical blocks, modules, and circuits described with reference to content disclosed in the present application. Alternatively, the processor may be a combination for implementing a computation function, for example, a combination of one or more microprocessors, or a combination of a DSP and a microprocessor. The communications module 1123 may be a transceiver, a transceiver circuit, a communications interface, or the like. The storage module 1121 may be a memory.

Figure 13:
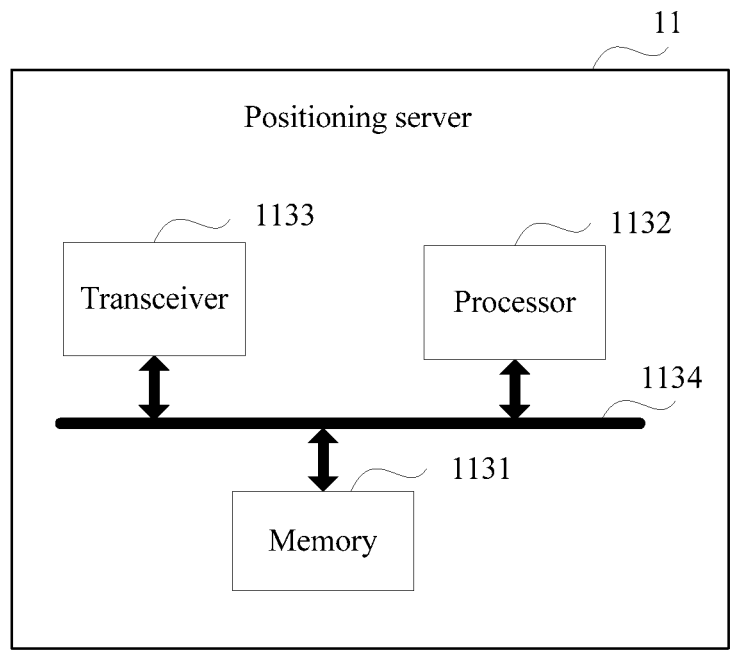
FIG. 13 is a schematic structural diagram of yet another positioning server according to an embodiment of the present application.

When the processing module 1122 is a processor, the communications module 1123 is a transceiver, and the storage module 1121 is a memory, the positioning server in this embodiment of the present application may be a positioning server 11 shown in FIG. 13.

As shown in FIG. 13, the positioning server 11 includes a processor 1132, a transceiver 1133, a memory 1131, and a bus 1134. The transceiver 1133, the processor 1132, and the memory 1131 are connected to each other by using the bus 1134. The bus 1134 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 13, but this does not mean that there is only one bus or only one type of bus.

Figure 14:
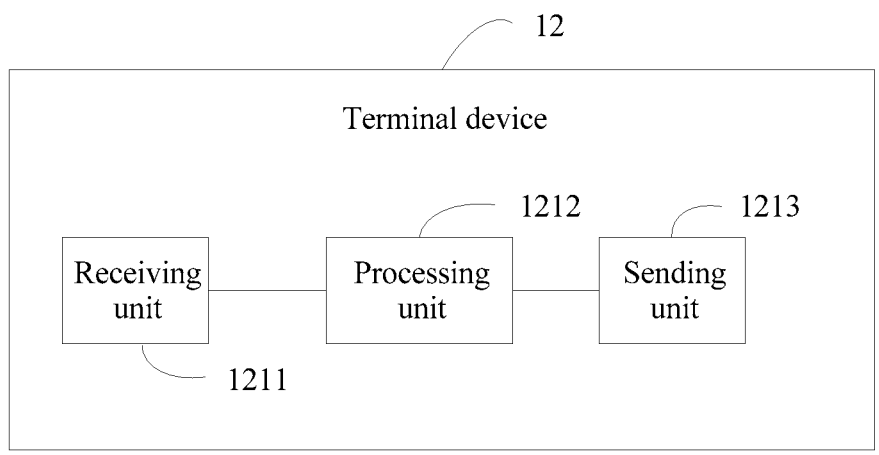
FIG. 14 is a schematic structural diagram of another terminal device according to an embodiment of the present application.

When the function modules are divided based on corresponding functions, FIG. 14 is a possible schematic structural diagram of a terminal device in the foregoing embodiments. The terminal device 12 includes a receiving unit 1211, a processing unit 1212, and a sending unit 1213. The receiving unit 1211 is configured to support the terminal device 12 in performing process S103 in FIG. 5, process S207 in FIG. 9, and process S303 in FIG. 10. The processing unit 1212 is configured to support the terminal device 12 in performing processes S104 and S105 in FIG. 5, processes S201 and S202 in FIG. 9, and processes S304 to S306 in FIG. 10. The sending unit 1213 is configured to support the terminal device 12 in performing process S203 in FIG. 9. All related content of steps in the foregoing method embodiments may be cited in function descriptions of corresponding function modules, and details are not described herein again.

Figure 15:
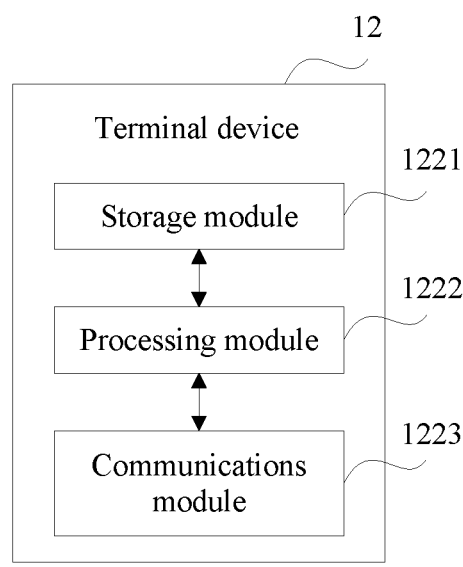
FIG. 15 is a schematic structural diagram of still another terminal device according to an embodiment of the present application.

When an integrated unit is used, FIG. 15 is a possible schematic structural diagram of a terminal device in the foregoing embodiments. The terminal device 12 includes a processing module 1222 and a communications module

Figure 1:
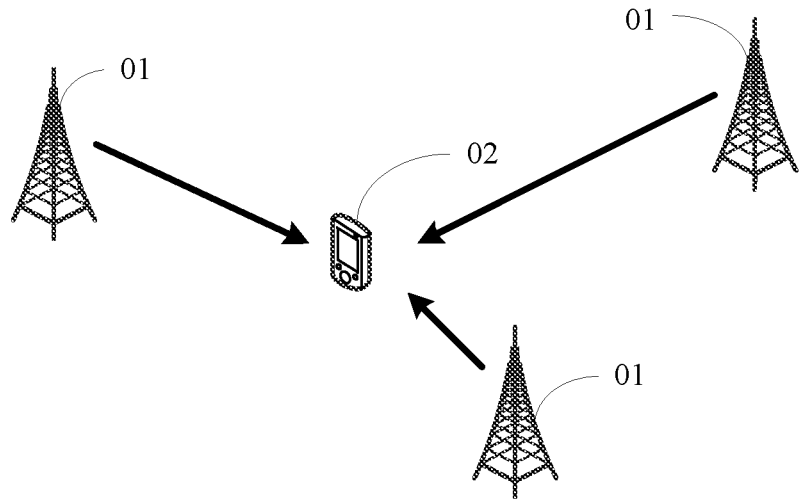
FIG. 1 is a schematic diagram of an OTDOA positioning technology according to an embodiment of the present application.

1223. The processing module 1222 is configured to control and manage an action of the terminal device. For example, the processing module 1222 is configured to support the terminal device 12 in performing processes S104 and S105 in FIG. 5, processes S201 and S202 in FIG. 9, processes S304 to S306 in FIG. 10, and/or other processes used in the technologies described in this specification. The communications module 1223 is configured to support the terminal device 12 in communicating with another network entity, for example, communicating with a function module or a network entity shown in FIG. 1. The terminal device 12 may further include a storage module 1221, configured to store program code and data of the terminal device.

The processing module 1222 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 1222 may implement or execute various example logical blocks, modules, and circuits described with reference to content disclosed in the present application. Alternatively, the processor may be a combination for implementing a computation function, for example, a combination of one or more microprocessors, or a combination of a DSP and a microprocessor. The communications module 1223 may be a transceiver, a transceiver circuit, a communications interface, or the like. The storage module 1221 may be a memory.

Figure 16:
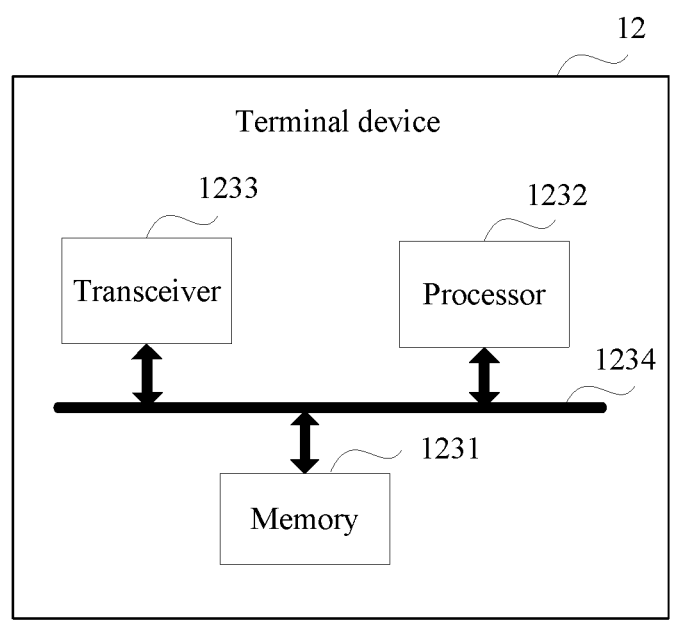
FIG. 16 is a schematic structural diagram of yet another terminal device according to an embodiment of the present application.

When the processing module 1222 is a processor, the communications module 1223 is a transceiver, and the storage module 1221 is a memory, the terminal device in this embodiment of the present application may be a terminal device 12 shown in FIG. 16.

As shown in FIG. 16, the terminal device 12 includes a processor 1232, a transceiver 1233, a memory 1231, and a bus 1234. The transceiver 1233, the processor 1232, and the memory 1231 are connected to each other by using the bus 1234. The bus 1234 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 16, but this does not mean that there is only one bus or only one type of bus.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A positioning server, comprising:
at least one processor; and
memory coupled to the at least one processor, the memory comprising instructions that, when executed by the at least one processor, cause the positioning server to perform operations including:
obtaining an system frame number (SFN) initialization moment of a cell i from the cell i, and an SFN initialization moment of a cell j from the cell j;
generating an SFN offset indication parameter of the cell i based on the SFN initialization moment of the cell i and the SFN initialization moment of the cell j by using the following formula:

$$\text{SFN\_offset}_i = \left\lfloor \frac{t_j - t_i}{T} \right\rfloor \bmod N,$$

where
SFN_offset$_i$ is the SFN offset indication parameter of the cell i; t$_j$ is the SFN initialization moment of the cell j that is reported by the cell j; t$_i$ is the SFN initialization moment of the cell i that is reported by the cell i; T is a time length of a radio frame; N is a positive integer and indicates a maximum indication range of the SFN offset indication parameter; and $\lfloor \; \rfloor$ is a rounding down operation; and
sending the SFN offset indication parameter of the cell i to a terminal device.

2. The positioning server according to claim 1, wherein the sending the SFN offset indication parameter of the cell i to a terminal device comprises:
sending the SFN offset indication parameter to the terminal device by using an LTE Positioning Protocol (LPP) message.

3. The positioning server according to claim 1, wherein the sending the SFN offset indication parameter of the cell i to a terminal device comprises:
sending the SFN offset indication parameter to the terminal device through the cell j by using an LTE Positioning Protocol A (LPPa) message.

4. A apparatus, comprising:
at least one processor; and
memory coupled to the at least one processor, the memory comprising instructions that, when executed by the at least one processor, cause the apparatus to perform operations including:
receiving an SFN offset indication parameter of a cell i from a positioning server, wherein the SFN offset indication parameter indicates a relative offset between an SFN of a radio frame m of the cell i and an SFN of a radio frame n of a cell j;
obtaining a frame number SFN$_j$ of the radio frame n of the cell j; and
determining a phase rotation parameter of the cell i based on the frame number SFN$_j$ of the radio frame n of the cell j and the SFN offset indication parameter of the cell i; or
obtaining, based on the frame number SFN$_j$ of the radio frame n of the cell j and the SFN offset indication parameter of the cell i, a sequence initialization factor c$_{init}$ used by a narrowband positioning reference signal (NPRS) on the radio frame m of the cell i, and obtaining the NPRS on the radio frame m of the cell i based on the sequence initialization factor c$_{init}$ of the cell i.

5. The apparatus according to claim 4, wherein a time difference between an initialization moment of the radio frame m of the cell i and an initialization moment of the radio frame n of the cell j is less than a time length of one radio frame.

6. The apparatus according to claim 4, wherein the initialization moment of the radio frame m of the cell i is later than the initialization moment of the radio frame n of the cell j.

7. The apparatus according to claim 4, wherein when the cell j is a serving cell of the apparatus, the SFN of the radio frame n is determined by the apparatus based on at least one of a synchronization signal or broadcast information sent by the cell j.

8. The apparatus according to claims 4, wherein the receiving an SFN offset indication parameter of a cell i from a positioning server comprises:
   receiving the SFN offset indication parameter from the positioning server by using an LTE Positioning Protocol (LPP) message.

9. The apparatus according to claim 4, wherein the receiving an SFN offset indication parameter of a cell i from a positioning server comprises:
   receiving, by using an LTE Positioning Protocol A (LPPa) message, the SFN offset indication parameter sent by the positioning server through the cell j.

10. The apparatus according to claim 4, wherein the determining a phase rotation parameter of the cell i based on the frame number $SFN_j$ of the radio frame n of the cell j and the SFN offset indication parameter of the cell i comprises:
    if a phase rotation parameter of a narrowband secondary synchronization signal (NSSS) transmitted by the cell j on the radio frame n is $\theta_f = 33/132(SFN_j/2) \bmod 4$, and
    if the SFN offset indication parameter $SFN\_offset_i$ of the cell i is an odd number, determining, by the terminal device, that a phase rotation parameter $\theta'_f$ used by an NSSS received on a next radio frame of the radio frame m of the cell i is as follows:

$$\theta'_f = \frac{33}{132}\left\{\left[\frac{132}{33}\theta_f - \left(\frac{SFN\_offset_i - 1}{2}\right)\right] \bmod 4\right\};$$

or
    if the SFN offset indication parameter $SFN\_offset_i$ of the cell i is an even number, determining that a phase rotation parameter $\theta'_f$ used by an NSSS received on the radio frame m of the cell i is as follows:

$$\theta'_f = \frac{33}{132}\left\{\left[\frac{132}{33}\theta_f - \frac{SFN\_offset_i}{2}\right] \bmod 4\right\}.$$

11. A positioning system, comprising a positioning server, wherein the positioning server is configured to:
    obtain an SFN initialization moment of a cell i from the cell i, and an SFN initialization moment of a cell j from the cell j;
    generate an SFN offset indication parameter of the cell i based on the SFN initialization moment of the cell i and the SFN initialization moment of the cell j by using the following formula:

$$SFN\_offset_i = \left\lfloor \frac{t_j - t_i}{T} \right\rfloor \bmod N,$$

where
    $SFN\_offset_i$ is the SFN offset indication parameter of the cell i; $t_j$ is the SFN initialization moment of the cell j that is reported by the cell j; $t_i$ is the SFN initialization moment of the cell i that is reported by the cell i; T is a time length of a radio frame; N is a positive integer and indicates a maximum indication range of the SFN offset indication parameter; and $\lfloor \rfloor$ is a rounding down operation; and
    send the SFN offset indication parameter of the cell i to a terminal device.

12. The system according to claim 11, wherein the sending the SFN offset indication parameter of the cell i to a terminal device comprises:
    sending the SFN offset indication parameter to the terminal device by using an LTE Positioning Protocol (LPP) message.

13. The system according to claim 11, comprising a terminal device, wherein the terminal device is configured to receive the SFN offset indication parameter.

* * * * *